(12) United States Patent
Chang et al.

(10) Patent No.: US 8,120,756 B2
(45) Date of Patent: Feb. 21, 2012

(54) LASER DOPPLER VELOCITY SYSTEM FOR VARIABLE BEAM FOCUSING

(75) Inventors: Seok-Kyu Chang, Daejeon (KR);
Sung-Hoon Baik, Daejeon (KR);
Chul-Hwa Song, Daejeon (KR)

(73) Assignees: Korea Atomic Energy Research Institute, Daejeon (KR); Korea Hydro & Nuclear Power Co., Ltd, Seoul (KR)

( * ) Notice: Subject to any disclaimer, the term of this patent is extended or adjusted under 35 U.S.C. 154(b) by 262 days.

(21) Appl. No.: 12/405,999

(22) Filed: Mar. 17, 2009

(65) Prior Publication Data

US 2009/0237643 A1 Sep. 24, 2009

(30) Foreign Application Priority Data

Mar. 18, 2008 (KR) .................. 10-2008-0025038

(51) Int. Cl.
*G01C 3/08* (2006.01)
(52) U.S. Cl. ......................... 356/28; 356/28.5
(58) Field of Classification Search ........... 356/3.01–28, 356/28.5
See application file for complete search history.

(56) References Cited

U.S. PATENT DOCUMENTS

| | | | | |
|---|---|---|---|---|
| 6,081,388 | A * | 6/2000 | Widl | 359/666 |
| 2004/0036873 | A1* | 2/2004 | Dam-Hansen et al. | 356/336 |
| 2006/0106426 | A1* | 5/2006 | Campbell | 607/3 |

\* cited by examiner

*Primary Examiner* — Thomas Tarcza
*Assistant Examiner* — Luke Ratcliffe
(74) *Attorney, Agent, or Firm* — TIPS Group (57) ABSTRACT

Disclosed is a laser doppler velocity system that can easily change a focal length of laser beam, in order to measure the velocity of fluid. As the fluid lens is used in order to focus the laser beam, the lens aperture is rapidly and accurately changed at a low power to easily measure the flow-velocity and shear stress of the boundary layer of the structure within the flow field. As the optical array including the fluid lens is integrated using a diode laser as a laser light source, the laser doppler velocity system can be made in small-size. Also, as the laser doppler velocity system is inserted into the surface of the structure, it can be used as a surface flow field measurement sensor.

9 Claims, 11 Drawing Sheets

LASER DOPPLER VELOCITY SYSTEM FOR VARIABLE BEAM FOCUSING

CROSS REFERENCE TO RELATED APPLICATIONS

This application claims priority to Korean Patent Application No. 10-2008-0025038, filed on Mar. 18, 2008, in the Korean Intellectual Property Office, the entire contents of which are hereby incorporated by reference.

BACKGROUND OF THE INVENTION

1. Field of the Invention

The present invention relates to a laser doppler velocity system for variable beam focusing, and more particularly, to a laser doppler velocity system for variable beam focusing that can easily change a focal length of laser beam in order to measure flow and shear stress, etc. flowing on the surroundings of a structure within flow field.

2. Description of the Related Art

With the recent development of optical measurement technology, a laser doppler velocimeter (LDV) system that is a laser doppler velocity system using doppler effect has been widely used in measuring flow-velocity of a flow field.

As a general measurement method for measuring flow-velocity, a probe mounted with a focusing lens is installed so that a focus thereof is formed on an external measurement position of a flow field mounted with a visible window and then scattered light of flow particles is detected by scanning laser thereon, thereby measuring flow-velocity. In order to move a measurement point, the probe is transferred mechanically using a transfer device, etc. The reason why the probe is transferred according to measurement points is that the focal length of the focusing lens is fixed.

Meanwhile, when measuring flow, flow-velocity information in a boundary layer region of a structure within the flow field is very important in view of engineering.

Figure 1:
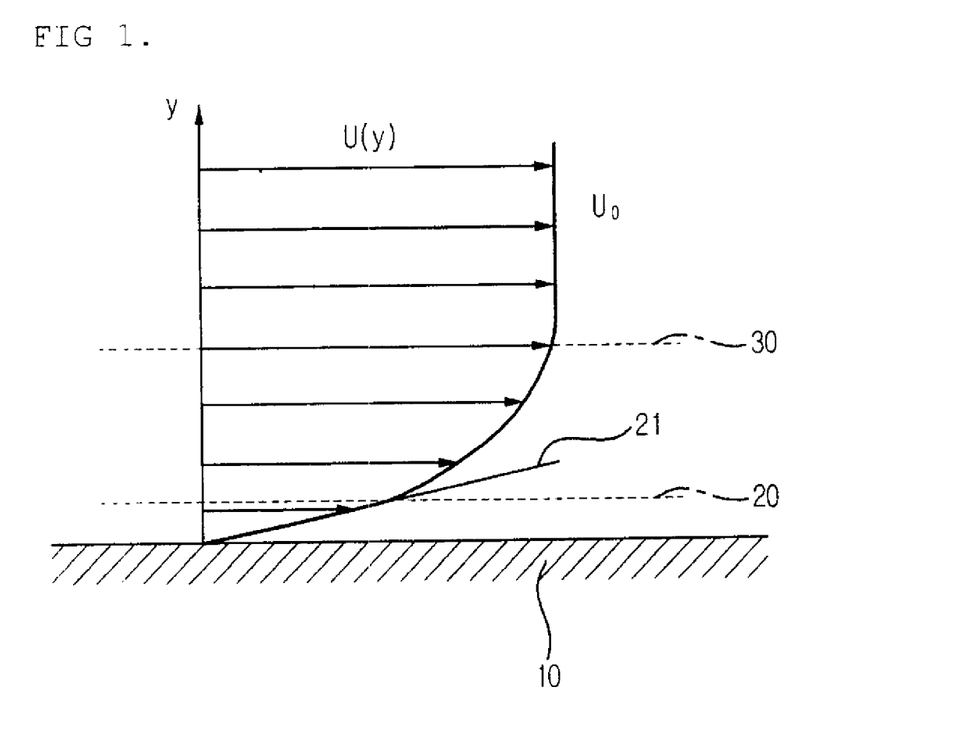
FIG. 1 is a schematic view of a flow-velocity distribution on a boundary layer on a structure surface within a flow field.

FIG. 1 is a schematic view illustrating velocity gradient of a boundary layer shown on a surface of a structure within a flow field. As shown in FIG. 1, from a surface 10 to a certain region 30, there is a boundary layer 30 having velocity gradient U(y) by receiving shear friction force of the surface. Within the boundary layer 30, as being closer to a structure by the shear friction force with the structure, flow-velocity is gradually reduced to be "0" on the surface 10 of the structure. On the position that is distant from the surface by the certain region or more, the effect of shear force is little to cause a region where flow-velocity $U_0$ is the same. In particular, it has been known that in a low boundary layer 20 region, the velocity gradient is linear, and surface shear stress of the structure is linearly proportional to the velocity gradient in the case of Newtonian fluid. Therefore, the exact flow measurement within the boundary layer 30 in a y direction is very important in obtaining information on the surface shear stress as well as on the flow-velocity distribution around the structure.

As such a boundary layer is a region adjacent to the surface of the structure, and in order to obtain the surface shear stress, etc. sometimes requires securing a plurality of measurement points within 1 mm of the surface so that a LDV system having a fine resolution is needed, and as such there is a limit in using a general LDV system according to the prior art and a measuring method thereof.

A small-sized LDV system proper for such a usage has been recently developed to be widely used for various applications. For example, MSE in the United States has developed a mini-LDV by making a probe small using a semiconductor layer so that the mini-LDV has been used in measuring flow of a boundary layer. Also, in order to measure surface shear stress of a structure by being approached closer to the surface, a measurement device for shear stress only that is to be integrated on the surface of the structure has been also developed. Since the measurement devices have laser focusing lenses whose focal lengths are fixed, in the case of the mini-LDV, a mechanical transfer device should still be used and in the case when the mini-LDV uses a small-sized sensor integrated on the surface, the measurement position cannot but be fixed.

Figure 2:
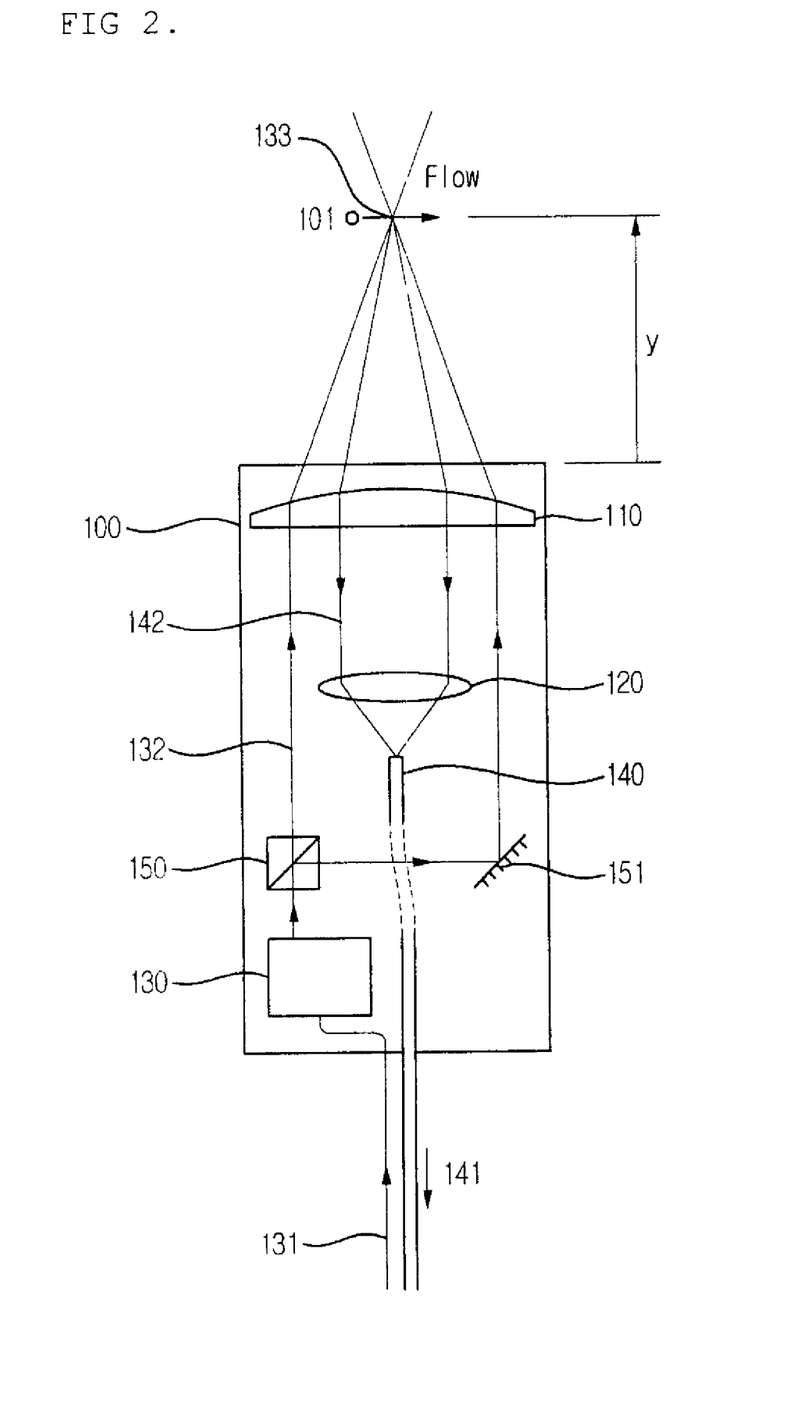
FIG. 2 is a schematic view of a mini-LDV system of the prior art.

FIG. 2 shows a general LDV, in particular, a concept view of a small-sized LDV probe integrated with a small-sized diode laser having low output when a focal length of a focusing lens is not long. Reviewing the operation principle, if power 131 for generating laser is supplied to a LDV probe 100 sighted on a measurement position in a flow field, laser beam is generated by a laser which is a device in a light generating unit 130, and this is divided into parallel light 132 by a beam splitter 150 and a reflector 151, thereby being transferred to a focusing lens 110. The laser beam focused on a measurement point 133, that is, a focal length y, by the focusing lens forms a fringe and suspended particles 101 passing through the region scatter the laser beam.

The scattered light 142 causes a frequency shift (doppler effect) corresponding to the velocity of the suspended particles, and a portion of the scattered light 142 is returned to be focused by a light receiving lens 120 within the probe. The focused optical signals are transmitted to a frequency analyzer 141 through an optical cable 140. The doppler frequency is detected from the frequency analyzer 141, such that the flow-velocity at the measurement point can be known.

In a general laser focusing lens 110 of the system, the focal length y is fixed so that the entirety of the probe 100 should be moved in order to change the measurement point according to the y direction and thus, a separate mechanical transfer device should be coupled therewith. Therefore, an additional transfer device is required and thus, the volume of the device is increased, causing a limit in rapid and exact driving of the transfer of the probe.

Such a problem results from the reason that the probe itself should be transferred since the focal length of the focusing lens is fixed, as described above. Thereby, problems arise in that the rapid measurement of the flow-velocity is difficult and troublesome, and furthermore the efficiency of flow-velocity measurement is deteriorated.

SUMMARY OF THE INVENTION

The present invention is proposed to solve the problems. An object of the present invention is to make a LDV probe a small-sized sensor type integrated on the surface and to allow the LDV probe to measure surface shear stress as well as flow-velocity of a boundary layer on a structure surface wherein focus of a laser focusing lens can be randomly changed.

Also, another object of the present invention is to make the measurement of the surface shear stress using one measurement device as well as to measure the flow-velocity at a certain position around the structure by applying a LDV system where a focus is changed to obtain the flow measurement.

Also, another object of the present invention is to make a measurement sensor small and to guarantee a rapid and exact operation thereof by allowing the measurement sensor to be operated without using a separate mechanical transfer device in measuring flow-velocity at a certain position around the structure.

Also, another object of the present invention is to provide a laser doppler velocity system that can measure flow-velocity rapidly and improve its efficiency remarkably, as focus of a laser focusing lens is changeable.

In order to accomplish the above objects, according to an embodiment of the present invention, there is provided a laser doppler velocity system comprising: a light generating unit that generates laser beam; a beam splitter that divides the laser beam into a plurality of light sources; an focusing lens, which is an insulator, that has fluid lenses each containing polar and non-polar fluid therein so that the divided light sources are focused and output to a position where a flow-velocity is to be measured to form a focus; a variable beam focusing implementing unit that changes a spherical surface of the focusing lens by providing electromotive force to the polar fluid and changing surface tension; a receiving lens that receives and integrates scattered light of the laser beam having the focus; and an operating unit that calculates the flow-velocity by detecting doppler frequency of the integrated scattered light.

In accordance with one embodiment of the present invention, the beam splitter may include: a splitter unit that divides the generated laser; and a reflector that reflects a portion of the divided laser to change the path thereof. The operating unit may be a frequency analyzer capable of measuring a flow-velocity at the measurement point by detecting the doppler frequency.

Preferably, the variable beam focusing implementing unit provides electromotive force to the focusing lens to change the radius of curvature of the focusing lens. For this, the focusing lens receives first and second liquid, the first and second liquid not mixed with each other, having the same specific gravity, to form a boundary layer.

Preferably, the first liquid is conductive liquid and the second liquid is insulating liquid.

In accordance with other embodiment of the present invention, the focusing lens may be made of transparent and elastic material to have a spherical surface that is changed according to the amount of liquid filled therein.

Preferably, the variable beam focusing implementing unit controls the amount of liquid inside the focusing lens to change the spherical surface of the focusing lens. For this, the variable beam focusing implementing unit includes: an inlet tube that flows liquid into the focusing lens; an outlet tube that removes the liquid from the focusing lens; and a pump that flows the liquid.

In accordance with another embodiment of the present invention, the variable beam focusing implementing unit may be coupled to the focusing lens to provide tension and contraction to the focusing lens. Here, the variable beam focusing implementing unit includes: an actuator that produces tension and/or contraction; and a connection unit that is connected to the actuator and the focusing lens to stretch or pull the focusing lens using the tension and/or contraction and to change the spherical surface of the focusing lens.

Preferably, the actuator includes at least one of a voice coil motor (VCM) and a piezoelectric element.

According to the present invention, the flow-velocity distribution around the surface of the structure within the flow field can be rapidly and exactly measured, without using a separate mechanical transfer device for transferring the probe, and the LDV probe is formed in a small-sized sensor type integrated on the surface but is able to measure the surface shear stress as well as the flow-velocity of the boundary layer on the structure surface so that the focus of the laser focusing lens can be randomly changed.

Also, another effect of the present invention is to make the measurement of the surface shear stress using one measurement device as well as to measure the flow-velocity at a certain position around the structure by applying the LDV system where a focus is changed to obtain the flow measurement.

Also, the mechanical transfer device is not required, and the probe can be easily made in a small-size such that it can be a measurement sensor by being integrated with the structure.

BRIEF DESCRIPTION OF THE DRAWINGS

These and other objects, features, aspects, and advantages of the present invention will be more fully described in the following detailed description of preferred embodiments and examples, taken in conjunction with the accompanying drawings. In the drawings.

DETAILED DESCRIPTION OF THE INVENTION

Hereinafter, preferred embodiments of the present invention will be described in detail with reference to the accompanying drawings. However, the present invention should not be construed as limited to the embodiments set forth herein. When inserting reference numerals into the constituents in the respective drawings, although the constituents are illustrated in different drawings, so far as the constituents are the same, they are described to have the same reference numeral, where possible.

Hereinafter, a first preferred embodiment of the present invention will be described in detail with reference to the accompanying drawings.

Figure 3:
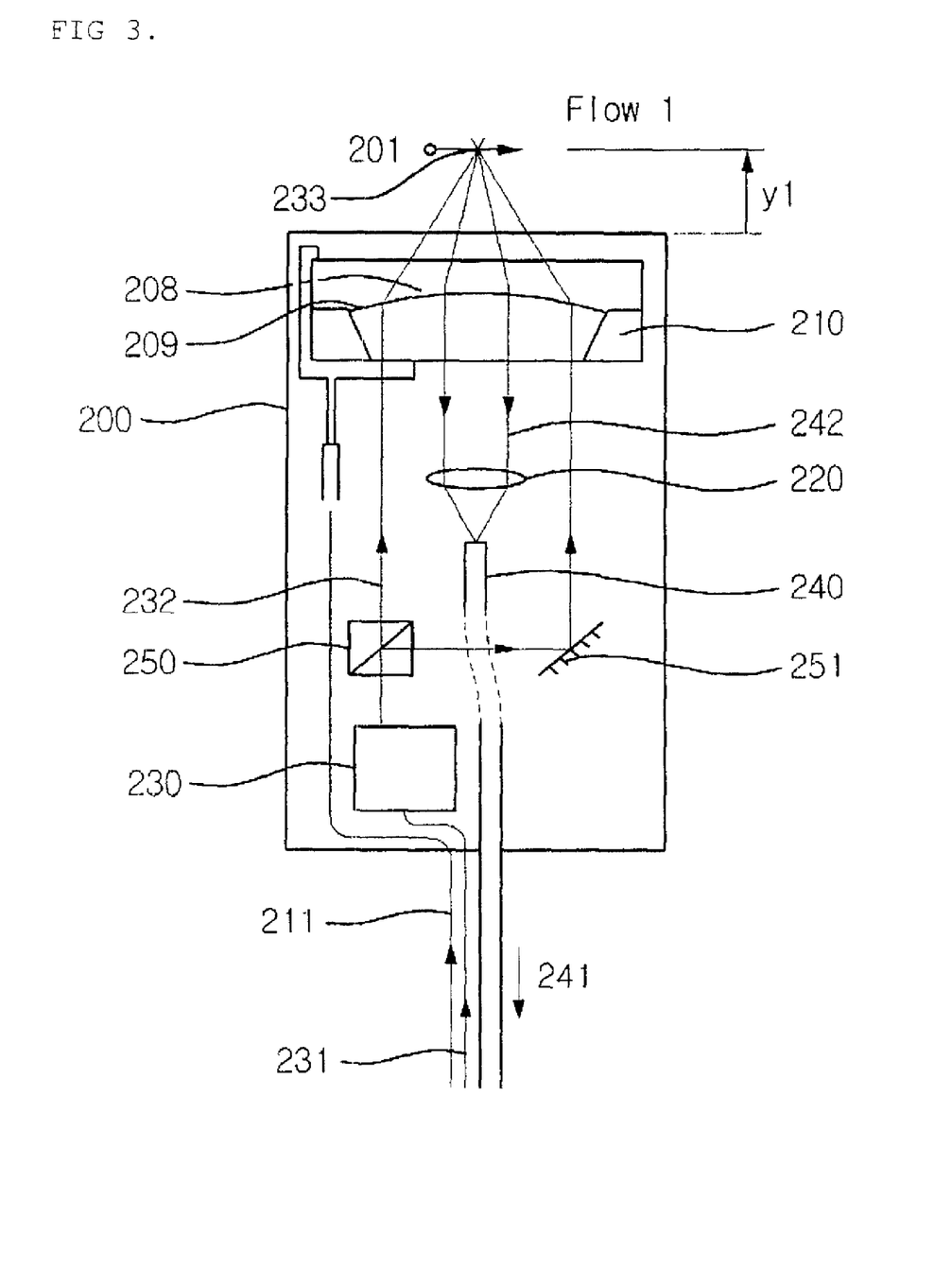
FIG. 3 is a construction view showing a laser doppler velocity system according to a first embodiment of the present invention.

FIG. 3 is a construction view showing a probe of a laser doppler velocity system according to a first embodiment of the present invention.

As shown in FIG. 3, a light generating unit 230 that generates laser is provided in a probe 200 of the laser doppler velocity system. Also, a beam splitter 250 that divides light of the laser generated from the light generating unit 230 into two is provided in the probe 200 of the laser doppler velocity system, and a focusing lens 210 that forms a focus of the output laser and a receiving light lens 220 that collects the input laser light are provided therein.

First, the focusing lens 210 that may be considered as the core technical feature preferably uses a fluid lens containing fluid therein instead of a general fixed focal lens in order to arbitrarily change a focus of the focusing lens.

The fluid lens, which is the optical technique that has been actively studied in recent times, preferably uses a method to change the focal length of the lens by changing the curvature of a liquid spherical surface by generating the potential difference between conductive liquid and a container using an electrowetting phenomenon, and also preferably uses a method to control the focal length of the lens by changing the spherical surface of the liquid container by injecting liquid into and adjusting contents of a flexible and transparent container.

At this time, in the method to change the focal length by generating the potential difference between conductive liquid and the container, the liquid inside the fluid lens contain polar and non-polar fluid respectively, wherein the spherical surface of the liquid container is formed of insulator. The applied potential difference changes surface tension of the polarity liquid, thereby causing a change in shape of the liquid container to change the focal length.

The fluid lens is advantageous in that it can be easily made in small-size and a rapid and accurate variable focus can be implemented at low power. The function for changing a beam focusing of such a fluid lens is applied to the LDV system, making it possible to allow the probe itself to be integrated with the measurement structure without using a mechanical transfer device and to measure the surface shear stress as well as the flow-velocity of the peripheral boundary layer.

Next, the light generating unit 230 will be described. The light generating unit 230 preferably produces laser beam using a diode, and a laser source for measuring may generate laser having predetermined frequencies by means of various generating devices such as He—Ne, Ar-ion, etc. and be selected according to its use purpose.

Next, the beam splitter unit 250 will be described. The laser beam generated from the light generating unit 230 is evenly divided by the beam splitter 250 to be sent to the focusing lens 210. During the process, a proper optical system can be used in order to adjust a beam path.

Hereinafter, the operation of the present invention will be described.

The laser beam generated from the light generating unit 230 is divided into parallel light 232 and reflected light by means of the beam splitter 250. The reflected light is reflected on a reflector 251, and the parallel light 232 and the reflected light pass through the focusing lens 210 parallel to each other.

The focusing lens 210, which is the fluid lens, is adjusted to be focused on a first measurement point 233 by forming a spherical surface 208 by means of the applied electromotive force 211. The laser focused on the first measurement point 233, that is, on a focal length y1, forms a fringe and suspended particles 201 passing through this region scatter the laser beam. The scattered light 242 causes a frequency shift (doppler effect) corresponding to the velocity of the suspended particles and a portion of the scattered light 242 is retrogressed to be focused by means of the light receiving lens 220 in the probe. The focused optical signals are transmitted 241 to a frequency analyzer through an optical cable 240. The doppler frequency is detected from the frequency analyzer, making it possible to obtain the flow-velocity at the first measurement point 233.

Figure 4:
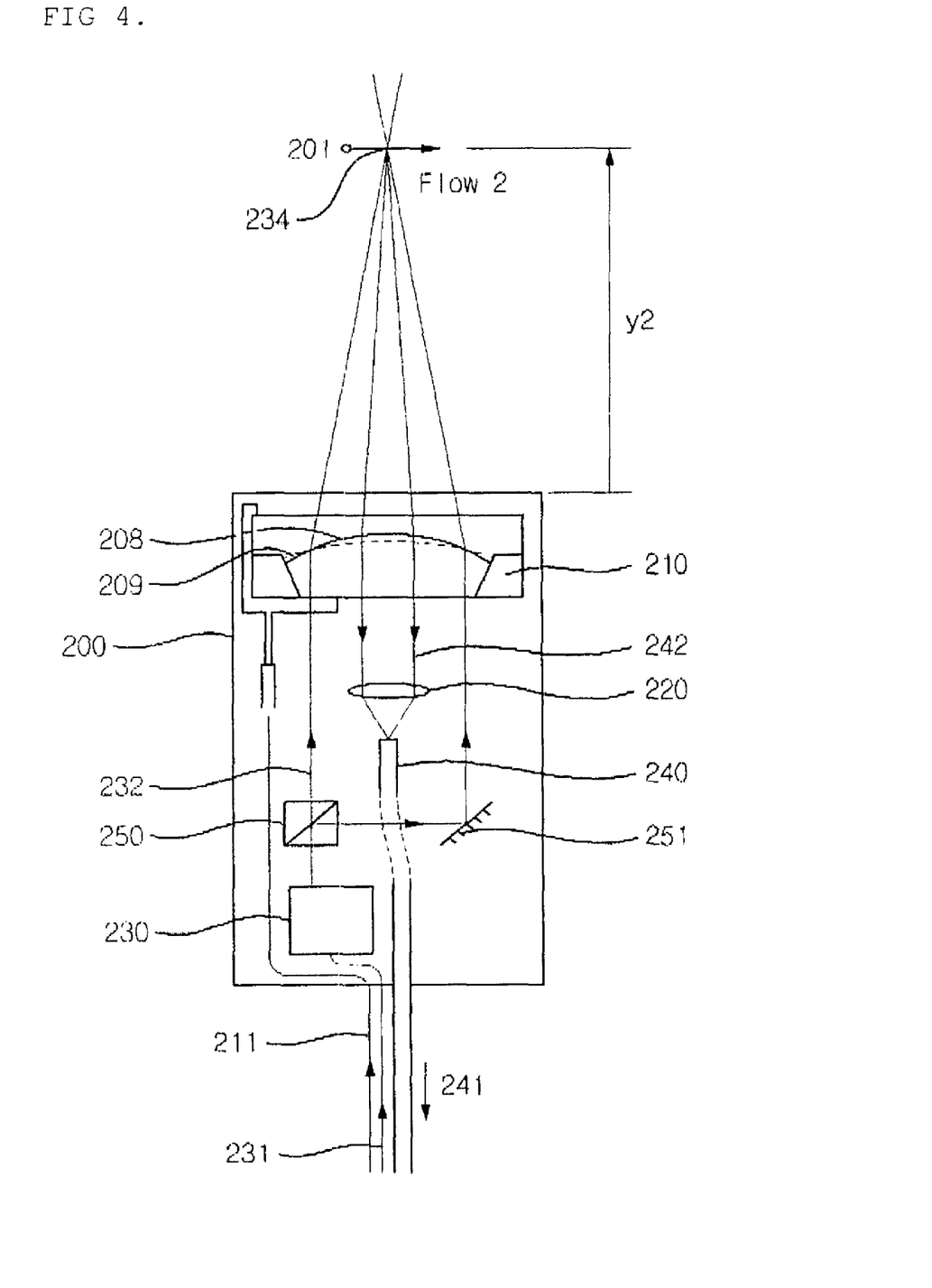
FIG. 4 is a construction view showing an operation where the focal length in the laser doppler velocity system according to the first embodiment of the present invention is changed.

At this time, when the velocity of other suspended particles is to be measured by changing the focal lengths, that is, when the flow-velocity at the changed position in the y direction is to be measured, the electromotive force 211 applied to the focusing lens 210 is properly changed to change the spherical surface of the fluid lens, as the reference number 209 shown in FIG. 4, thereby controlling the focusing lens 210 to have the focal length y2 focused on another position 234.

The doppler frequency is detected by collecting the scattered light 242 by means of suspended particles 201 of the laser beam 232 in the method as described above, making it possible to know the flow-velocity at a second measurement point 234. As the focal length of the focusing lens 210 is changed in this manner, the flow-velocity distribution of the boundary layer around the surface 10 of the structure can be measured, and in particular, the surface shear stress of the structure can be also measured by measuring the flow-velocity at a low boundary layer 20, such that measurement variables that have been measured by each laser doppler velocity system and surface shear stress measurement device in the prior art can be measured using a single measurement device.

Figure 5:
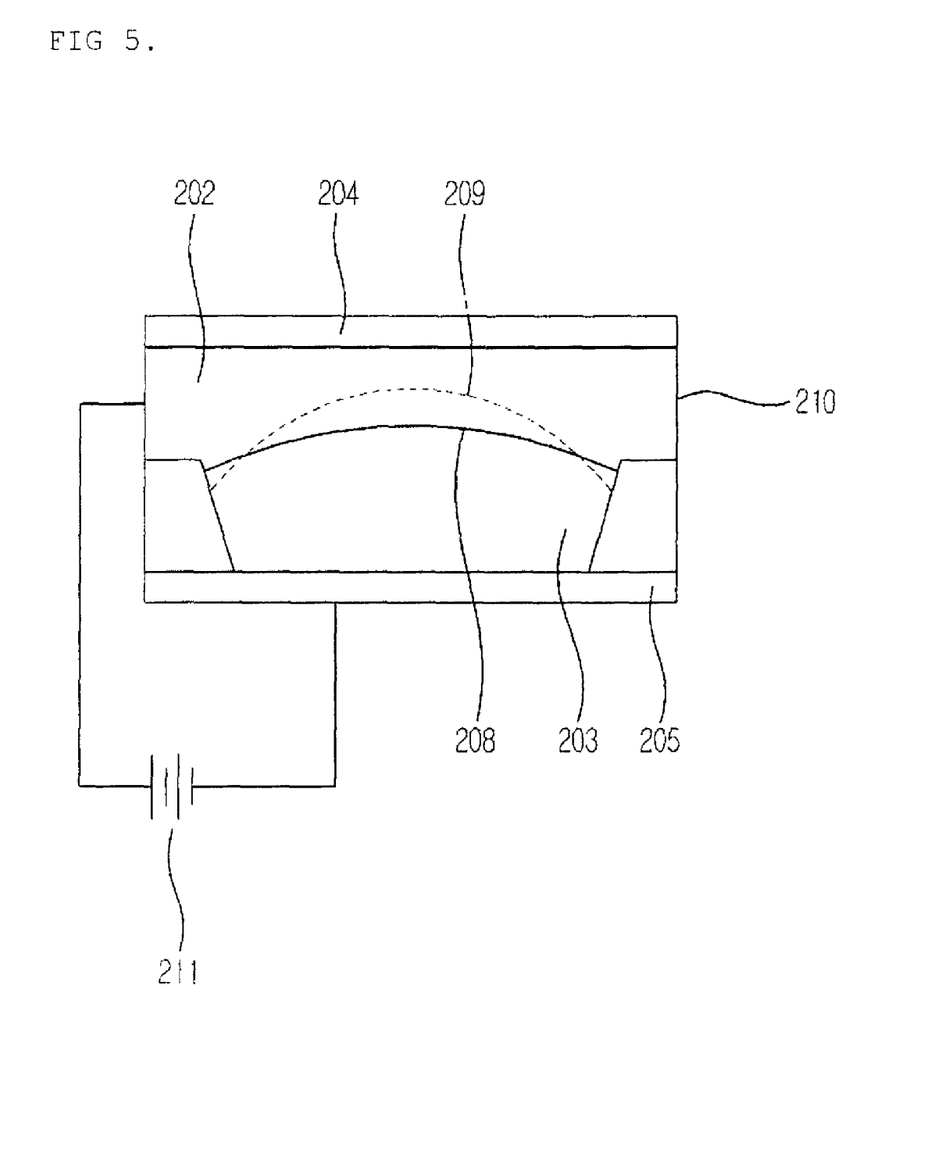
FIG. 5 is a schematic view illustrating the principle of spherical change of the focusing lens according to the first embodiment.

As described above, the core feature of the present invention is to have different focal lengths by changing the spherical surface of the fluid lens by applying electromotive force to the focusing lens. The operation principle thereof is shown in FIG. 5.

The fluid lens has a cylinder-type container 210 having upper part and lower part sealed with transparent insulators 204 and 205 that is filled with liquid having proper optical characteristics, wherein the upper part is filled with conductive liquid 202 and the lower part is filled with insulating liquid, wherein the two liquids maintain a state wherein they are not mixed with each other, having the same specific gravity, to form a boundary layer.

At this time, if a potential difference is applied to the conductive liquid 202 and a lower panel of the transparent insulator 205, a radius of curvature of the liquid boundary layer is changed. This is known as an electrowetting phenomenon, where voltage is changed to control 208 and 209 the radius of curvature of the fluid lens, thereby implementing a changing of beam focusing.

In other words, as the spherical surfaces 208 and 209 of the lens are changed as shown in FIGS. 3 and 4, the focal length can be simply changed, making it possible to very easily obtain the velocity gradient according to the shear stress.

Hereinafter, a second embodiment of the present invention will be described.

Figure 6:
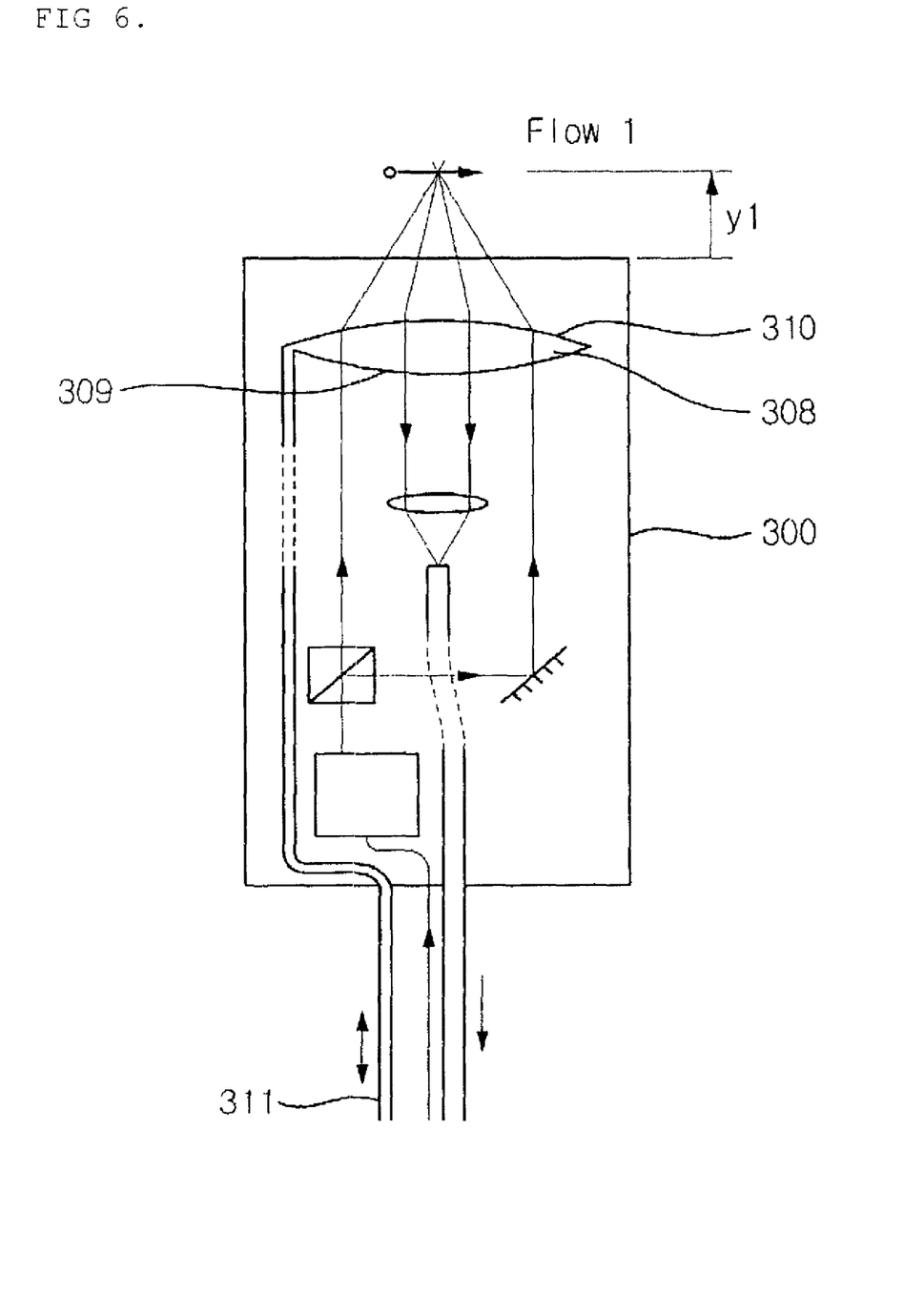
FIG. 6 is a construction view showing a laser doppler velocity system according to a second embodiment of the present invention.

FIG. 6 is a construction view showing a probe of a laser doppler velocity system according to a second embodiment of the present invention.

The portions the same as the first embodiment will be omitted for simplification and clearness.

Figure 7:
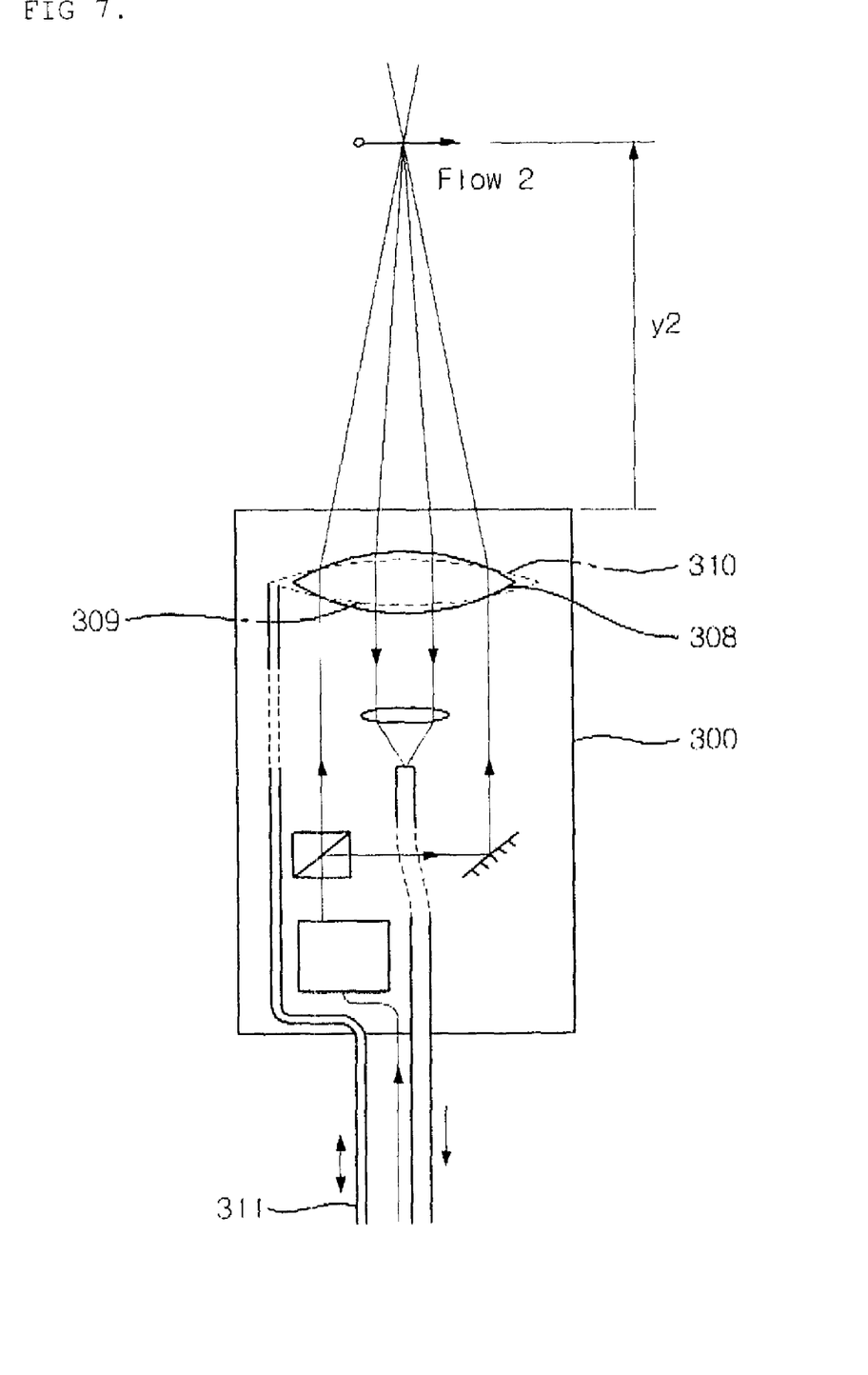
FIG. 7 is a construction view showing an operation where the focal length in the laser doppler velocity system according to the second embodiment of the present invention is changed.

Compared to the first embodiment, the second embodiment is different in that in the driving method of the fluid lens 310 that functions as the focusing lens 300, the amount of liquid 302 filled in the bag made of transparent and flexible material is controlled to change the radius of curvature of the spherical surface. In other words, as the shapes of the spherical surfaces 308 and 309 of the fluid lens 310 are changed by discharging or inflowing 311 the liquid 302 having optical characteristics through a tube, the focal lengths y1 and y2 are formed to be short (i.e. y1) or long (i.e. y2), thereby changing the position of the measurement point. The example where the position of the measurement point is changed as the shapes of the spherical surface are changed is shown in FIG. 7.

Figure 8:
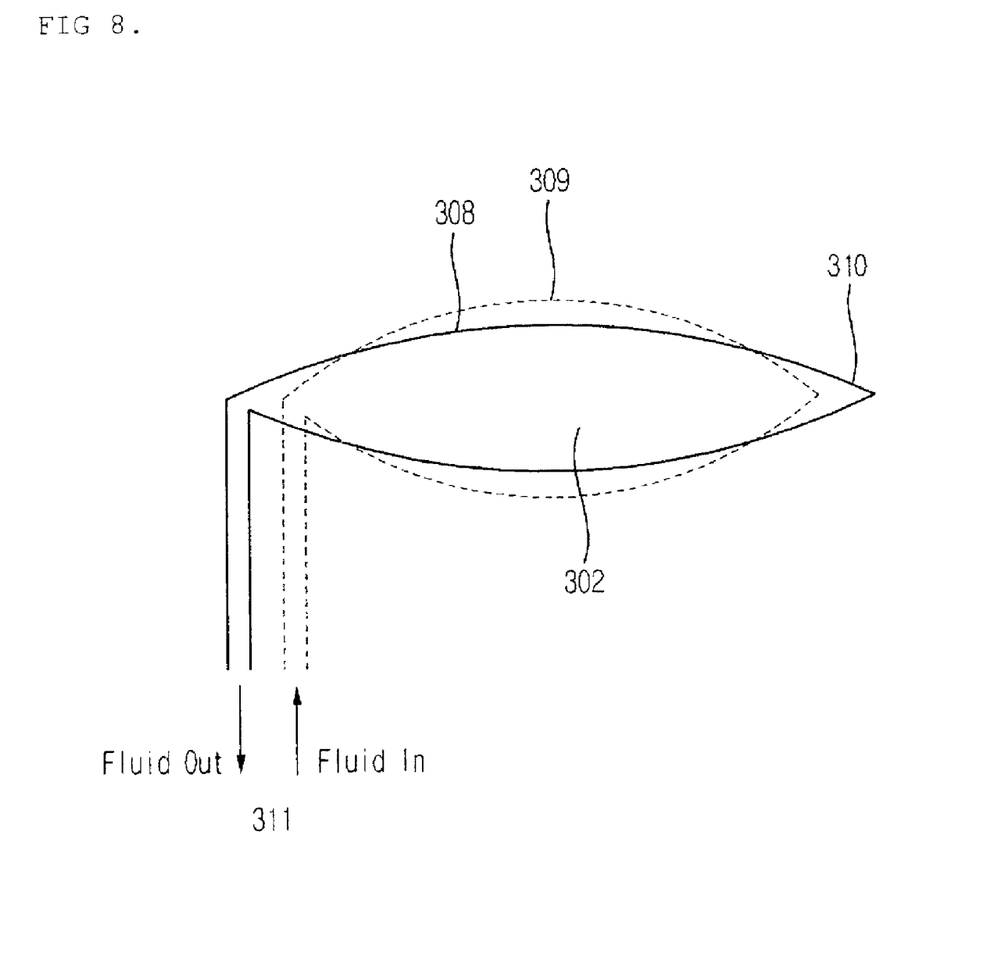
FIG. 8 is a schematic view illustrating the principle of spherical change of the focusing lens according to the second embodiment.

FIG. 8 shows a driving principle of a fluid lens using a method where the amount of liquid filled in the bag made of transparent, elastic and flexible material is controlled to change the radius of curvature of the spherical surface.

As the liquid 302 having optical characteristics is discharged from or flowed into the container 310 made of transparent and elastic material through the tube connected to the peripherals of the container, the radii of curvature 308 and 309 of the spherical surfaces of the liquid container are formed to be short or long, making it possible to control the focal lengths of the lens. A pump for discharging and inflowing the liquid may include various devices operated by electrical and mechanical power.

Figure 9:
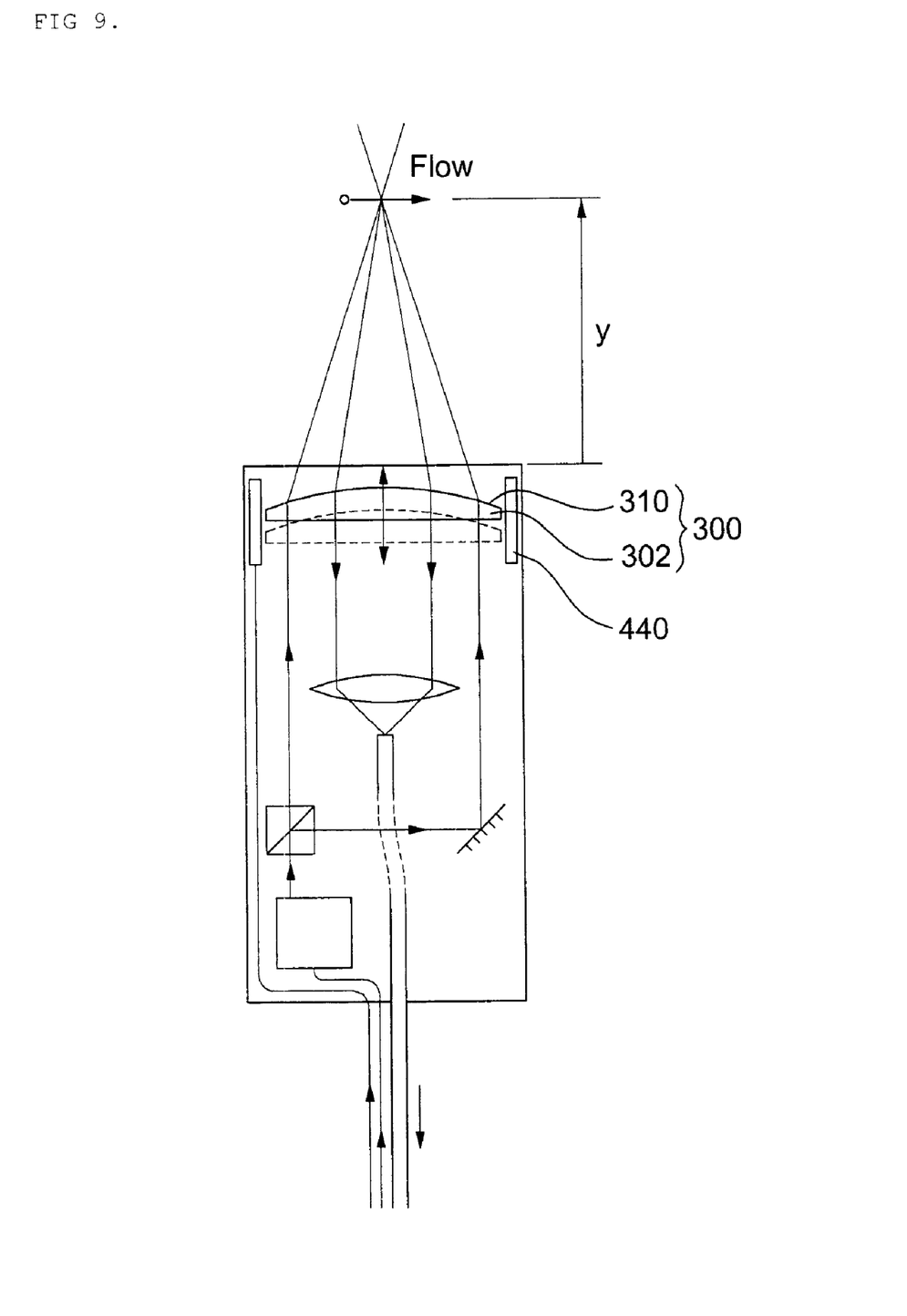
FIG. 9 is a schematic view showing the principle of spherical change of the focusing lens according to a modified embodiment of the second embodiment.

The control of the spherical surface of such a focusing lens 300 may include methods other than the method to use the inflow and outflow of the liquid. FIG. 9 is proposed in order to more specifically describe this feature.

FIG. 9 is a schematic view showing the principle of spherical change of the focusing lens according to a modified embodiment of the second embodiment.

As shown in FIG. 9, the fluid lens 300 may have a shape attached with a device capable of having tension and contraction to the peripherals of the liquid container 310 in the radius direction, without having external input and output for liquid, in a state where the liquid container is filled with a predetermined amount of liquid 302, and an actuator 440 for driving the liquid container 310 may include various devices operated by electrical and mechanical power. The actuator 440 is connected to the focusing lens 300 through a connection unit (not shown), and the tension or/and the contraction are transferred to the focusing lens 300 through the connection unit. The transferred tension or/and the contraction stretches or pulls the liquid container 310 included in the focusing lens 300 to change the spherical surfaces of the focusing lens 300, thereby changing the focal length thereof.

Also, the actuator 440 may provide the tension or the contraction in order that the liquid container 310 is driven in the direction longitudinal to the direction that the laser is projected, making it possible to change the focal length of the focusing lens 300.

At this time, the actuator 440 preferably includes at least one of a linear motor, a voice coil motor (VCM) or a piezoelectric element that is commonly used as a high-precision device to determine a position, but is not limited thereto.

Figure 10:
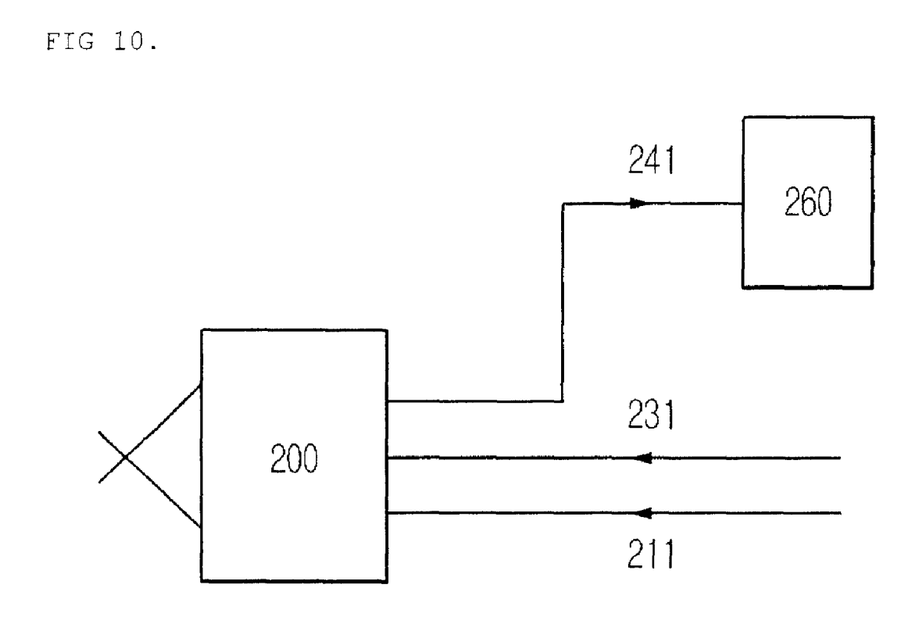
FIG. 10 is a schematic view of driving power and signal input/output.

FIG. 10 is a block diagram showing a LDV probe 200 including a fluid lens using an electrowetting phenomenon, inputs 211 and 231 of power for driving a laser generating device, and a processing device 260 for processing measured optical signals. The disposition of each of constituents illustrated in drawings may be changed, not limited thereto. In other words, the laser generating device 230 inside the probe 200 and the optical signal processing device 260 outside thereof, etc. may be disposed inside or outside the probe.

Figure 11:
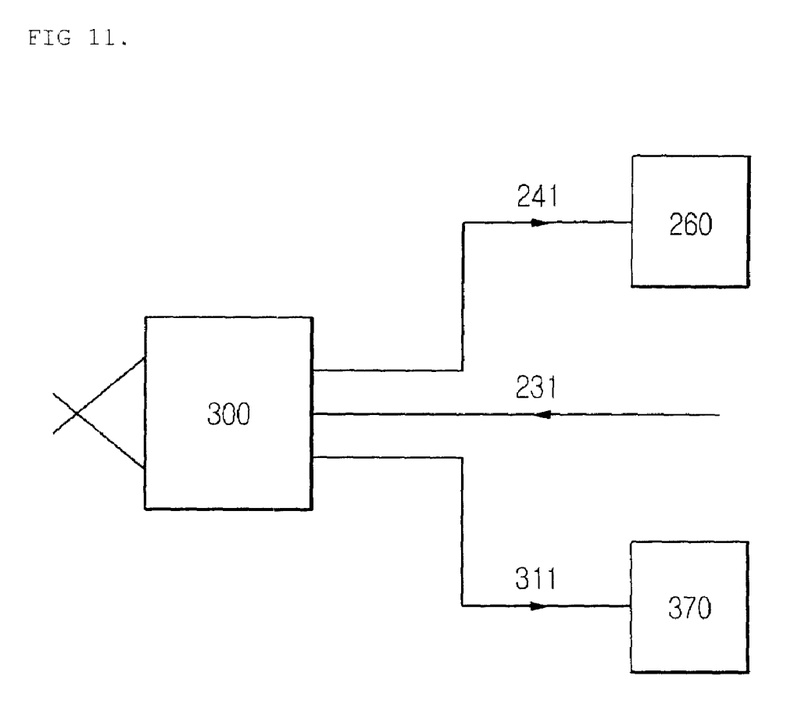
FIG. 11 is a schematic view of another driving power and signal input/output.

FIG. 11 shows a LDV probe 300 including a fluid lens using the control of the amount of liquid in a liquid container made of transparent and flexible material, a power input device 231, 370 that drives the fluid lens and a laser generating device, and a processing device 260 for processing measured optical signals. The disposition of each of constituents may be changed, and is not limited to the described embodiments. In other words, the laser generating device 230 inside the probe 200 and the optical signal processing device 260 to process the optical signal output 241 form the LEV probe 300 and the liquid transfer pump 370 outside thereof, etc. may be disposed inside or outside the probe.

While the present invention has been described with reference to the preferred embodiments, it will be understood by those skilled in the related art that various modifications and variations may be made therein without departing from the scope of the present invention as defined by the appended claims.

What is claimed is:

1. A laser doppler velocity system, comprising:
   a light generating unit that generates a laser beam;
   a beam splitter that divides the laser beam into a plurality of light sources;
   a focusing lens, which is an insulator, that has fluid lenses each containing polar and non-polar fluid therein so that the divided light sources are focused and output to a position where a flow-velocity is to be measured to form a focus;
   a variable beam focusing implementing unit that changes a spherical surface of the focusing lens by providing electromotive force to the polar fluid and changing surface tension;
   a receiving lens that receives and integrates scattered light of the laser beam having the focus; and
   an operating unit that calculates the flow-velocity by detecting doppler frequency of the integrated scattered light.

2. The laser doppler velocity system according to claim 1, wherein the beam splitter includes:
   a splitter unit that divides the generated laser; and
   a reflector that reflects a portion of the divided laser to change the path thereof.

3. The laser doppler velocity system according to claim 1, wherein the variable beam focusing implementing unit provides electromotive force to the focusing lens to change the radius of curvature of the focusing lens.

4. The laser doppler velocity system according to claim 1, wherein the focusing lens is made of transparent and elastic material to have a spherical surface that is changed according to the amount of liquid filled therein.

5. The laser doppler velocity system according to claim 4, wherein the variable beam focusing implementing unit controls the amount of liquid inside the focusing lens to change the spherical surface of the focusing lens.

6. The laser doppler velocity system according to claim 5, wherein the variable beam focusing implementing unit includes:
   an inlet tube that flows liquid into the focusing lens;
   an outlet tube that removes the liquid from the focusing lens; and
   a pump that flows the liquid.

7. A laser doppler velocity system, comprising:
   a light generating unit that generates a laser beam;
   a beam splitter that divides the laser beam into a plurality of light sources;
   a focusing lens, which is an insulator, that has fluid lenses each containing fluid that can be flowed-in and out therein so that the divided light sources are focused and output to a position where a flow-velocity is to be measured to form a focus;
   a variable beam focusing implementing unit that is coupled to the focusing lens to provide tension and contraction to the focusing lens;
   a receiving lens that receives and integrates scattered light of the laser beam having the focus; and an operating unit that calculates the flow-velocity by detecting doppler frequency of the integrated scattered light.

8. The laser doppler velocity system according to claim 7, wherein the variable beam focusing implementing unit includes:
an actuator that produces tension and/or contraction; and
a connection unit that is connected to the actuator and the focusing lens to stretch or pull the focusing lens using the tension and/or contraction and to change the spherical surface of the focusing lens.

9. The laser doppler velocity system according to claim 8, wherein the actuator includes at least one of a voice coil motor (VCM) and a piezoelectric element.

* * * * *